United States Patent [19]

Birchler

[11] Patent Number: 5,472,503

[45] Date of Patent: Dec. 5, 1995

[54] VERTICAL LOAD TRANSFERRING APPARATUS

[75] Inventor: Larry E. Birchler, Independence, Mo.

[73] Assignee: Lico, Inc., Kansas City, Mo.

[21] Appl. No.: 82,618

[22] Filed: Jun. 25, 1993

[51] Int. Cl.$^6$ .............................. B05C 3/02; B05C 3/04; B65G 49/02

[52] U.S. Cl. .............................. 118/423; 118/428; 134/76; 198/346.3

[58] Field of Search ......................... 198/346.3; 134/76, 134/135; 118/423, 428, 425; 74/569

[56] References Cited

U.S. PATENT DOCUMENTS

| | | | |
|---|---|---|---|
| 2,048,937 | 7/1936 | Larson | 118/66 |
| 2,609,954 | 9/1952 | Sutherland et al. | 414/626 |
| 3,058,604 | 10/1962 | Harper et al. | 198/346.3 X |
| 3,152,679 | 10/1964 | Lammert | 198/346.3 |
| 3,335,839 | 8/1967 | Neumann | 134/76 X |
| 3,415,398 | 12/1968 | Strecke | 198/346.3 |
| 3,432,046 | 3/1969 | Krusinski | 414/284 |
| 3,658,197 | 4/1972 | Di Donato | 134/76 X |
| 4,392,506 | 7/1983 | Tanaka et al. | 134/76 X |
| 4,772,374 | 9/1988 | Urquhart et al. | 118/425 X |
| 4,812,211 | 3/1989 | Sakai | 118/425 X |
| 4,854,236 | 8/1989 | Thünker et al. | 74/569 X |
| 4,890,633 | 1/1990 | Yasui | 134/76 |
| 4,895,101 | 1/1990 | Knorr | 118/425 |
| 4,993,275 | 2/1991 | Pollich et al. | 74/569 X |
| 5,224,390 | 7/1993 | Tysver | 74/569 X |

Primary Examiner—Robert J. Warden
Assistant Examiner—E. Leigh Dawson
Attorney, Agent, or Firm—Chase & Yakimo

[57] ABSTRACT

A raising and lowering mechanism is provided at a work station for vertically transferring articles or products delivered to the station by an overhead delivery conveyor. Discrimination between transfer of a load from the delivery conveyor and transfer back to the delivery conveyor is accomplished by a mechanical discriminator which appropriately conditions suspension hooks on the delivery conveyor for either releasing the load or reconnecting the load. The transfer mechanism employs a vertically reciprocating conveyor which is confined to a vertical transfer axis without the necessity to employ some degree of lateral movement to uncouple the load from the delivery conveyor, present the load at a working position within the work station, and return the load to the delivery conveyor. Drift compensation is provided to allow for some misalignment of a delivered load with the transfer axis. The drive system for the vertical conveyor may be coupled by a flexible linkage to other work stations to enable simultaneous operation of transfer mechanisms at a plurality of work stations with a single drive. In applications where articles are immersed in a treatment bath at a work station, the vertical conveyor may be modified to tip the load to bubble off trapped air.

12 Claims, 9 Drawing Sheets

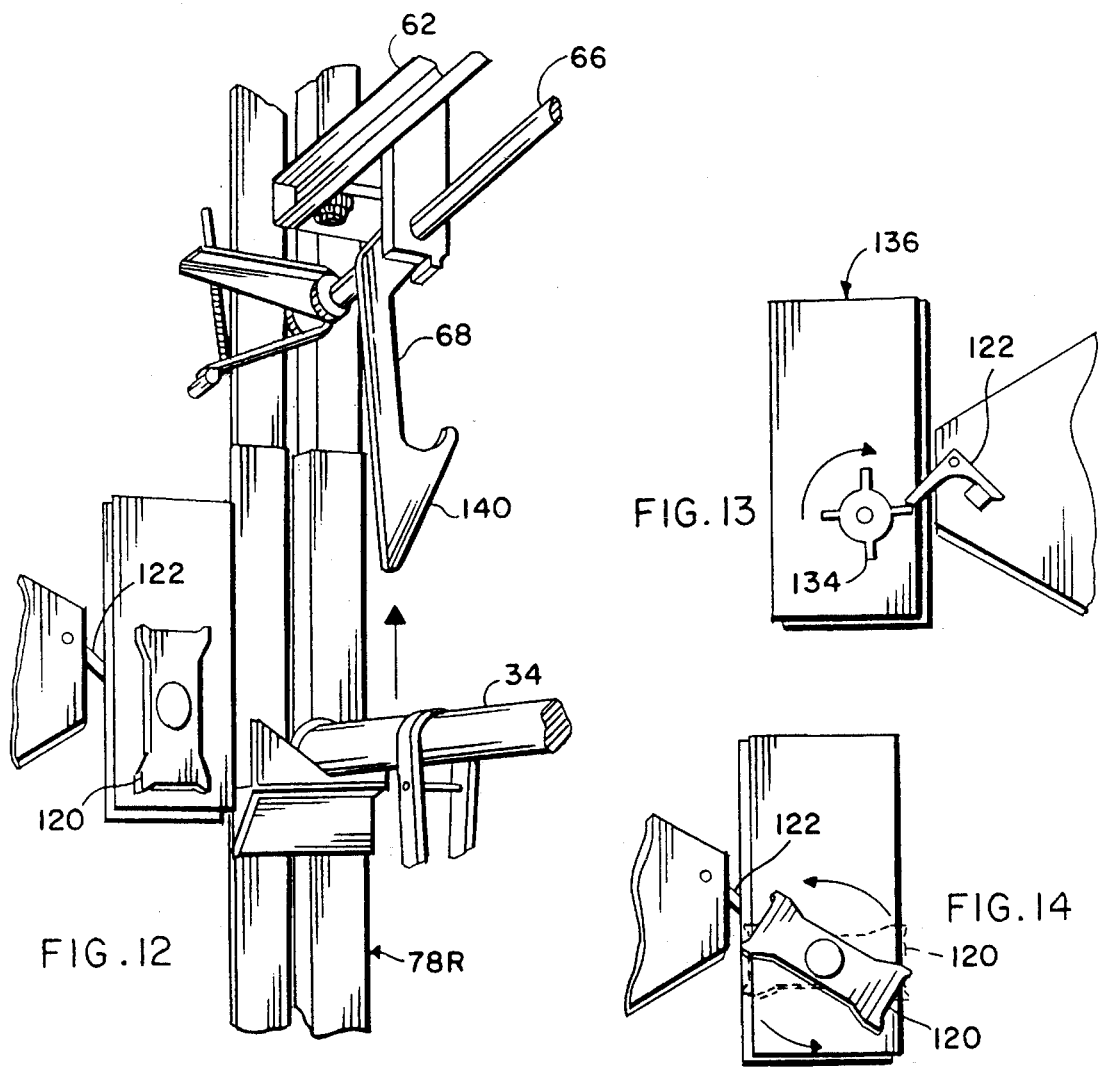
FIG. 12
FIG. 13
FIG. 14
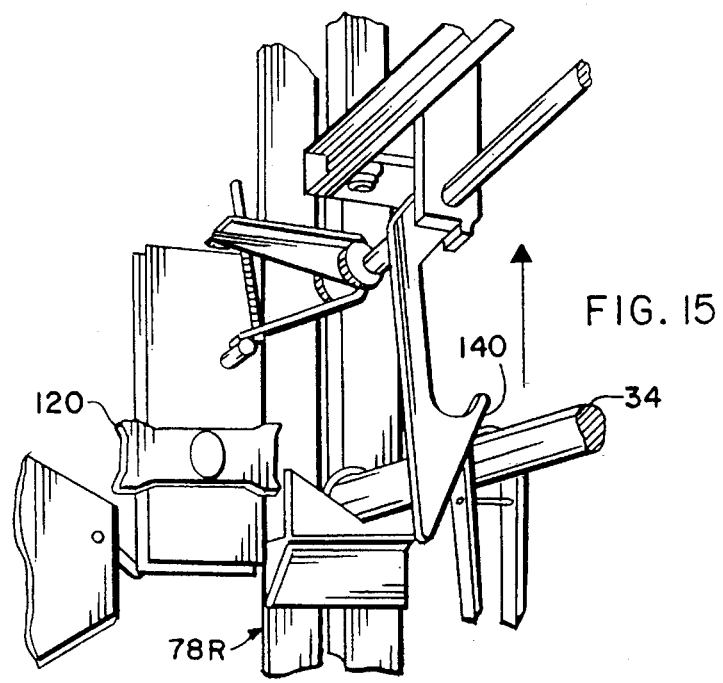
FIG. 15

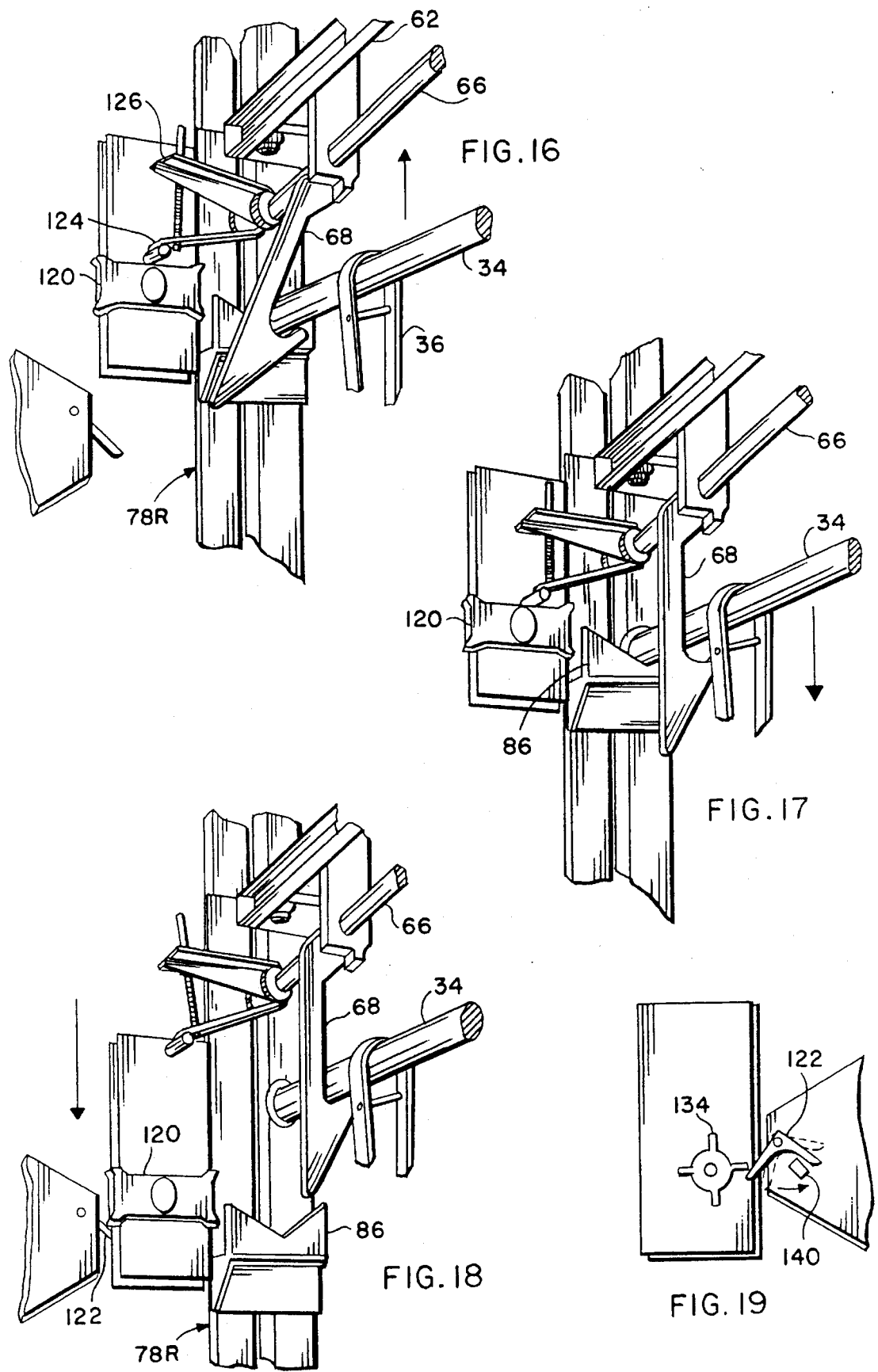

VERTICAL LOAD TRANSFERRING APPARATUS

BACKGROUND OF THE INVENTION

This invention relates to conveyor systems for vertically transferring articles or products from a delivery conveyor at an area where the load is to be treated or worked upon in some manner and, in particular, to such a system in which the load is separated from the delivery conveyor, transferred along a vertical transfer axis, and returned to the conveyor without displacing the load from the transfer axis.

Various automated production processes require that articles or products be transferred from a main conveyor line at stations where an operation is to be performed or articles are to be subjected to some chemical treatment, such as cleaning or the application of paint by dipping the articles in an appropriate treatment bath. Many techniques have been employed heretofore for this purpose as represented by several examples discussed below.

A conventional approach is to employ a bridge crane or a hoist suspended from overhead and manipulated by a human operator. Using this technique, the load is delivered by a conveyor in such a manner in that the bridge crane or hoist can be attached to the load and then operated to raise or lower the load through an independent path for a required process, and then either return the load to the delivery conveyor or to a subsequent processing point. Programmed bridges or programmed hoists are also employed and utilize control logic to automate the transfer function.

The essentially vertical transferring of a load may also be accomplished by the conveyor bearing the load by designing the conveyor with a capability to negotiate vertical changes in elevation. Often there is a degree of slope in the run connecting two elevations. This is referred to as continuous or synchronous conveying. A power and free conveyor may be employed.

Another means of vertically transferring a load is to utilize a section of the free rail of a power and free conveyor that can be raised or lowered. Using this approach, the load is transferred onto the shiftable section which is then raised or lowered by a secondary power means.

Other known systems include walking beam conveyors, the use of hoist mechanisms attached directly to a conveyor, "perch and free" and dual strand conveyors. All of these systems, however, have their attendant complexity and cost, and not all are suited to true vertical transferring of loads from one elevation to another.

SUMMARY OF THE INVENTION

It is, therefore, the primary object of the present invention to provide a raising and lowering mechanism at a work station where articles or products are to be delivered, which is capable of vertically transferring the articles or products without raising or lowering any portion of the conveyance system that delivers the load to the station, and without raising or lowering the supporting structure of either the conveyance system or the raising and lowering mechanism itself.

As a corollary to the foregoing object, it is an important aim of this invention to provide such a raising and lowering mechanism which relies on mechanical implementation to cause the delivered load to be separated from the conveyance system in order to be raised or lowered as required, and which utilizes simple control logic to complete the automation.

Another important object of this invention is to provide a raising and lowering mechanism for a delivered load which is capable of transferring the load to another elevation along a vertical transfer axis without curves and deviations and without the necessity to employ some degree of lateral movement to uncouple the load from the delivery conveyor, present the load at a working position within the work station, and return the load to the conveyor system.

Still another important object of the invention is to provide such a mechanically-based raising and lowering mechanism which discriminates between transfer from the delivery conveyor and transfer back to the delivery conveyor so as to appropriately condition a suspension member on the conveyor for either releasing the load or reconnecting the load to the conveyor.

Yet another important object of the present invention is to provide the delivery conveyor with a load suspension member in the form of a hook or hooks movable between a load-carrying position aligned with the transfer axis of the raising and lowering mechanism, and a load-releasing position displaced from said axis, the mechanism having the capability of discriminating between transfer of the load from the delivery conveyor and return of the load thereto, and mechanically shifting the hook to its load-releasing position once the load has been received by the mechanism for transfer from the delivery conveyor.

Furthermore, it is an important objective of this invention to provide the raising and lowering mechanism with a vertically reciprocating conveyor which is confined to the transfer axis and which receives and supports the load delivered by the delivery conveyor in a controlled relationship with the discriminator that assures that the suspension hook is shifted to release the load and provide transfer to the vertically reciprocating conveyor without requiring any lateral or horizontal deviation of the path of travel of the load from the transfer axis to either release the load or return it to the delivery conveyor.

It is also an important objective to provide such a raising and lowering mechanism which is capable of tipping the load after transfer to a working position in order to facilitate degassing of the load when immersed in a treatment bath.

Additionally, it is an important object of this invention to provide such a raising and lowering mechanism having drift compensation devices that allow the raising and lowering mechanism to engage and transfer a load that may not be precisely aligned with the transfer axis.

Finally, it is an important aim of this invention to provide a drive system for the raising and lowering mechanism which may be coupled by a simple linkage to raising and lowering mechanisms at other work stations in order to cause a simultaneous raising and lowering of articles and products at a plurality of work stations with a single drive.

DESCRIPTION OF THE DRAWINGS

FIG. 12 is a view similar to FIG. 11 but illustrates the mechanism traveling upwardly from the working position.

FIGS. 13 and 14 are similar to FIGS. 6 and 7 but show the actuator shifting the discriminator cam 90 degrees to an ultimate orientation illustrated in FIG. 15.

FIGS. 15 and 16 are further progressive views showing continued upward advancement of the mechanism to reengage the bar with the hook.

FIG. 17 shows the transfer mechanism reversing its direction at the upper limit of its travel to seat the bar in the hook.

FIG. 18 shows further downward movement of the mechanism toward the rest position.

FIG. 19 is a view similar to FIG. 13 but shows that the actuator does not shift the discriminator cam during downward movement.

DELIVERY CONVEYOR SYSTEM

Figure 1:
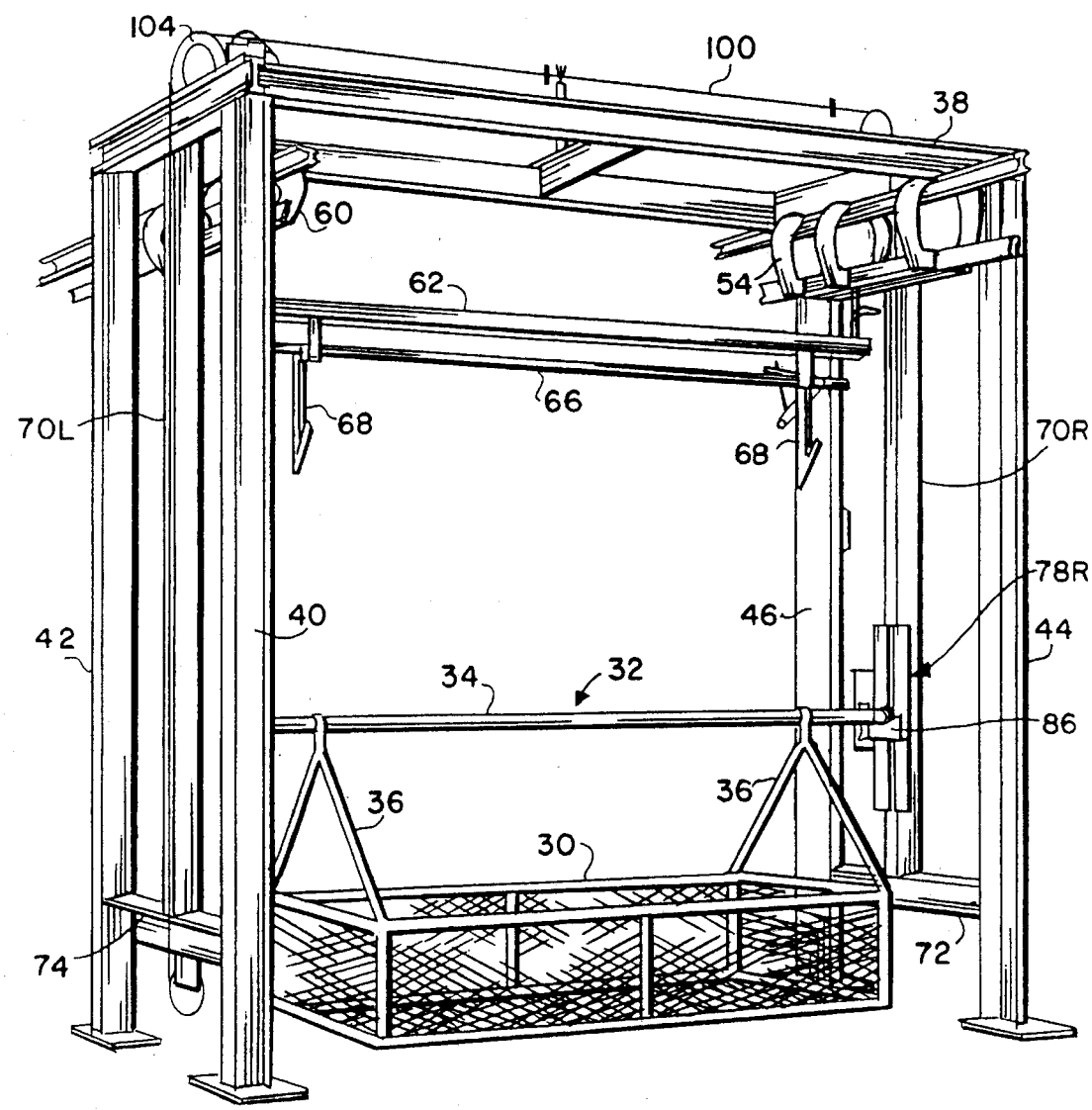
FIG. 1 is a perspective view showing a portion of an overhead delivery conveyor and the raising and lowering (transfer) mechanism of the present invention, an article holder being shown disengaged from the delivery conveyor and lowered to a working position.

Referring initially to FIG. 1, a work station is depicted where it is desired that articles or products delivered to the station by an overhead conveyor system be lowered into the station to a working position at the base of the station at which a carrier basket 30 for such articles or products is illustrated. The basket 30 is a component of an article holder generally designated 32 that has a horizontally extending suspension bar 34 to which the ends of the basket 30 are secured by a pair of hangers 36. The article holder 32 in FIG. 1 is shown at its lowermost position in the station to represent the working position where an operation on the articles or products in basket 30, or treatment thereof, is performed. For example, the basket 30 in the working position could be immersed in a tank (not shown) containing a chemical treatment bath for cleaning or painting metal parts carried by the basket. If the load is a large workpiece, it is understood that the basket 30 shown herein could be eliminated and the workpiece itself attached to the suspension bar 34.

Figure 2:
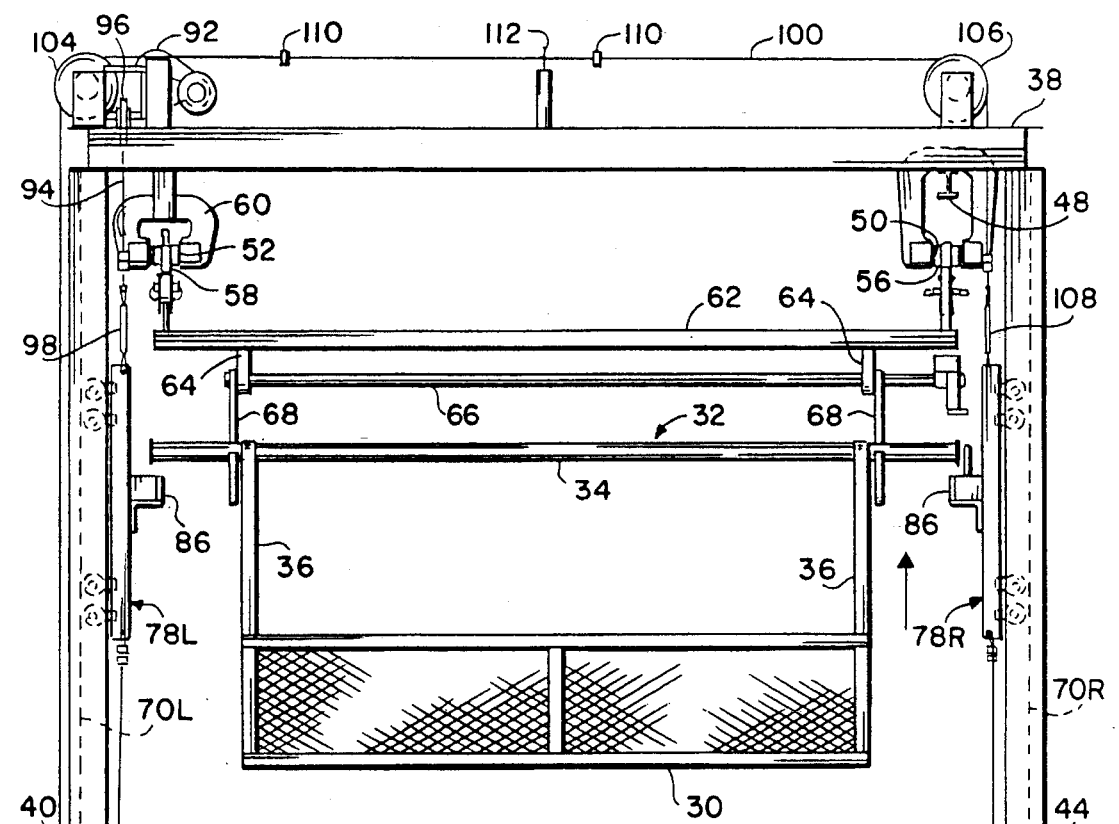
FIG. 2 is a front view of the apparatus shown in FIG. 1, the article holder being shown suspended from the delivery conveyor prior to transfer.

A framework (FIGS. 1 and 2) at the work station supports both the delivery conveyor system and the transfer mechanism to be described, and comprises a head frame 38 supported on four vertical legs 40 and 42 at the left and 44 and 46 at the right as viewed in FIGS. 1 and 2. The illustrated delivery conveyor system is of the overhead power and free type and includes an I-beam power track 48 (FIG. 4), a free carrier track 50 therebeneath consisting of a pair of confronting-aligned channel members, and a second free track 52 of the same construction at the opposite side of the station (FIG. 2). More particularly, three yoke plates 54 adjacent the right legs 44 and 46 embrace the power track 48 and are welded to its upper flange, the front and rear yokes 54 being secured to respective front and rear beams of the head frame 38. The free track 50 is suspended from the power track 48 by the yokes 54 as is clear in FIG. 4, and a trolley 56 riding in the track 50 is shown stopped at the work station. Similarly, on the left side of the station trolley 58 is shown in the free track 52 and is located at the same level as trolley 56. The free track 52 is suspended from the head frame 38 by three spaced yokes 60.

Figure 4:
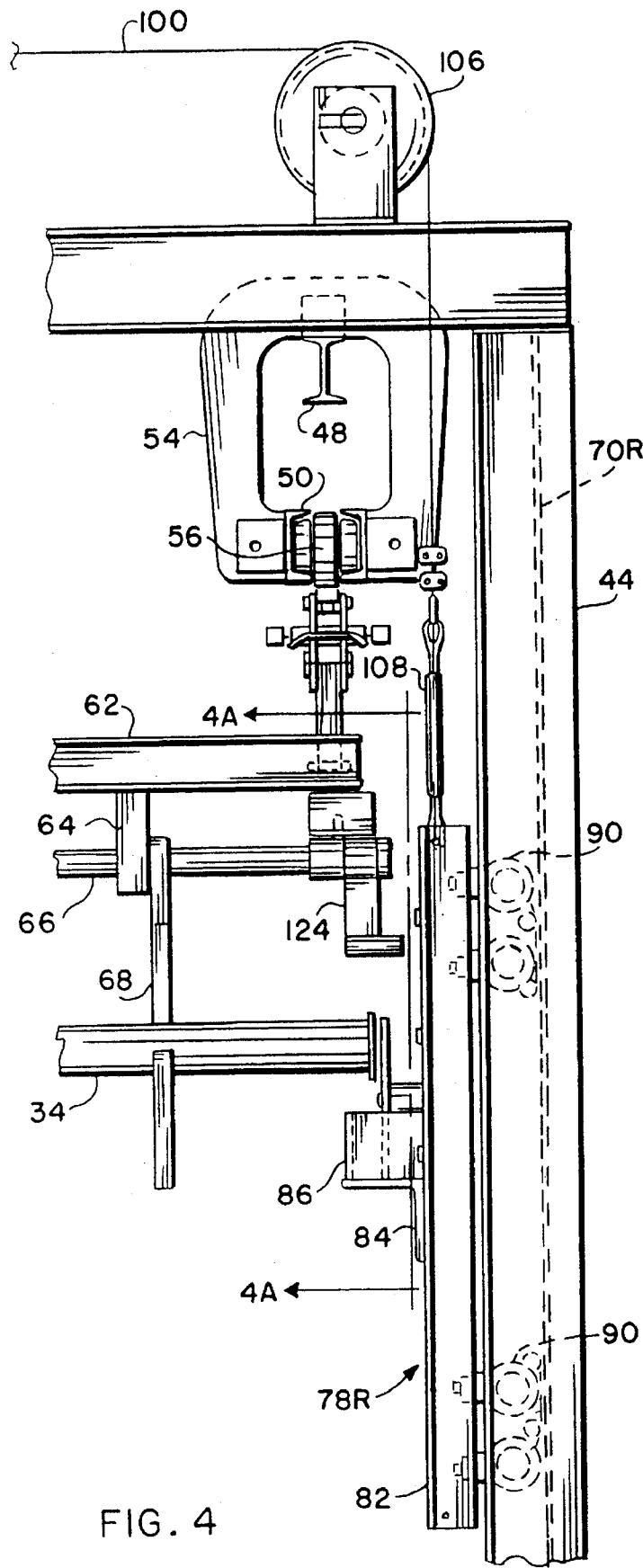
FIG. 4 is a fragmentary, front view of the right side of the apparatus shown in FIG. 2, on an enlarged scale, showing one of the receiving cradles of the transfer mechanism just prior to engagement with the suspension bar on the article holder.
Figures 5, 6, 7:
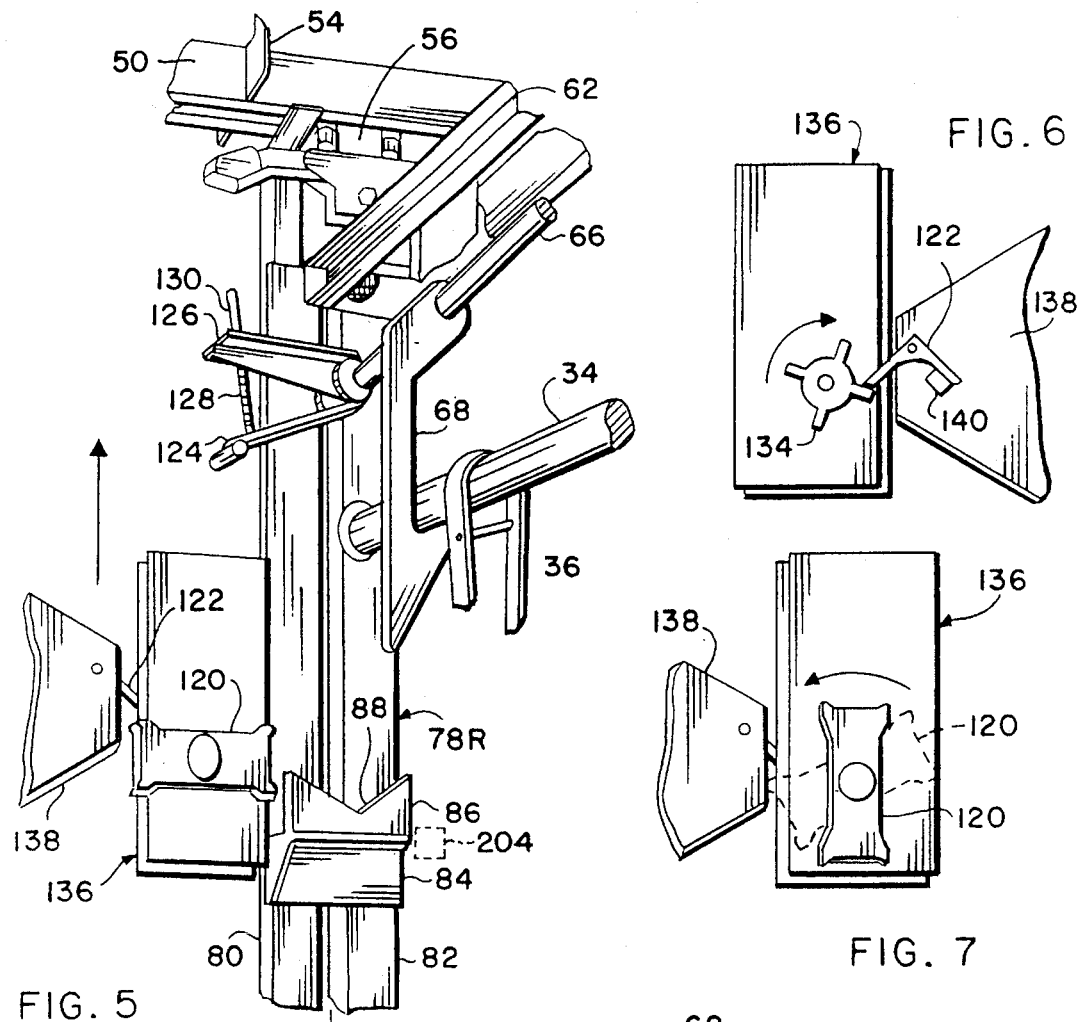
FIG. 5 is a fragmentary, perspective view showing the relative positions of the discriminator and cradle of the transfer mechanism as it begins upward movement from a rest or home position to receive a delivered load.
FIG. 6 is a detail view on the same scale as FIG. 5 showing the housing for the discriminator cam from the opposite side, and illustrating the action of the actuator that changes the position of the cam.
FIG. 7 is a detail view like FIG. 6 but viewing the discriminator cam as in FIG. 5, and illustrates that the cam has been shifted from the FIG. 5 position.

A horizontally extending carrier frame 62 spans the trolleys 56 and 58 and is secured to each at its ends, as shown in detail in FIGS. 4 and 5 for trolley 56. A pair of spaced legs 64 depend from carrier frame 62 and carry a horizontal suspension shaft 66 which is rotatable about its axis for a purpose to be described. A pair of suspension members in the form of hooks 68 are fixed to shaft 66 and depend therefrom adjacent legs 64 which are located near the corresponding ends of the carrier frame 62. The hooks 68 receive the suspension bar 34 of the article holder 32 during transport of the holder, and hence the load, to and from the work station (FIG. 2).

Although not illustrated, it will be appreciated that the described power and free conveyor system employs a powered conveyor chain carried by rollers in the power track 48, and which is provided with spaced power dogs or pushers which are engageable with the driving dog of the trolley train on the free track 50. The work station is a stop for the load-bearing trolleys which will, of course, be disengaged from the pushers and stationary on the free tracks 50 and 52 during the processing at the work station of the articles or products in basket 30. Although a power and free conveyor system is illustrated herein as the delivery conveyor, it should be understood that any type of conveyor could be employed for delivery the load to the vertical transfer mechanism of the present invention to be described in detail below.

THE VERTICAL TRANSFER MECHANISM

Referring particularly to FIGS. 1, 2, 4 and 5, a vertical track 70R is provided at the right side of the work station by a pair of spaced, confrontingly aligned channel members that present a hollow interior to provide a track configuration of the same type as seen in FIG. 4 for the free track 50. The track 70R extends from the head frame 38 downwardly to a cross member 72 between legs 44 and 46 adjacent their bottom ends. Likewise, at the left side of the work station, an identical vertical track 70L is disposed midway between the left legs 40 and 42 and extends from the head frame 38 downwardly to a cross member 74. The vertical tracks 70L and 70R define a vertical transfer axis for a load delivered by the power and free conveyor, the axis being depicted diagrammatically by the line 76 in FIG. 5 along which the parts of the transfer mechanism at the right side of the work station move. The transfer axis may also be viewed as a vertical plane in which both of the tracks 70L and 70R lie.

The components of the transfer mechanism at the right side of the work station will be described in detail, it being understood that identical components at the left side of the work station bear corresponding reference numerals. With particular reference to FIGS. 1, 4, 5 and 22, a conveyor member 78R is formed by a pair of elongated, side by side, closely spaced angle irons 80 and 82 bridged by a short angle piece 84 that is welded thereto. A cradle member 86 having a generally V-shaped, upper receiving surface 88 is welded to the top flange of the angle piece 84 and is spaced from the angle irons 80 and 82. A pair of vertically spaced trolleys 90 are attached to the parallel flanges of the angle irons 80 and 82 with their wheels disposed within the confines of the track 70R. Accordingly, the conveyor member 78R is guided by the track 70R for exclusively vertical movement upwardly and downwardly along the transfer axis 76.

A cable drive raises and lowers the left and right conveyor members 78L and 78R, and employs an electrically powered winch 92 mounted on the head frame 38 above the left legs 40 and 42. A cable section 94 extends from the winch 92 over a pulley 96 (FIG. 2) and downwardly to a turnbuckle 98 attached to the upper end of the left conveyor member 78L. A second cable section 100 extends from the lower end of the left conveyor member 78L downwardly to sheave 102 mounted below cross member 74. The cable section 100 is trained around sheave 102 and then extends upwardly adjacent the track 70L to a sheave 104 on the head frame 38 adjacent the winch 92. Cable section 100 then continues on around sheave 104 over the top of the framework to a sheave 106 at the right side of head frame 38, and thence downwardly to a turnbuckle 108 attached to the upper end of the right conveyor member 78R. Two spaced stops 110 on the overhead, horizontal stretch of cable section 100 are engageable with the actuator arm 112 of a limit switch 114 (FIG. 24) to set the upper and lower limits of the vertical travel of the conveyor members 78L and 78R.

The drive system enables several of the transfer mechanisms of the present invention at their respective work stations to be operated in series to cause raising and lowering to occur simultaneously at all work stations with a single drive, in those applications where simultaneous processing of articles or products is desired. This is accomplished by a connecting cable 116 or other flexible linkage attached to the bottom end of the right conveyor member 78R, the cable 116 extending downwardly around a sheave 118 near the bottom of the framework and then on to the second work station (not shown) where it would be connected to the initial cable section 94 at that station, replacing the winch that would otherwise be required. This allows a number of stations to be operated by a single drive. Alternatively, individual winches 92 may be employed at those work stations where independent operation is desired, thus the present invention provides for either serial or independent operation as dictated by the production or processing operation with which it is associated.

THE DISCRIMINATOR

Figure 4A:
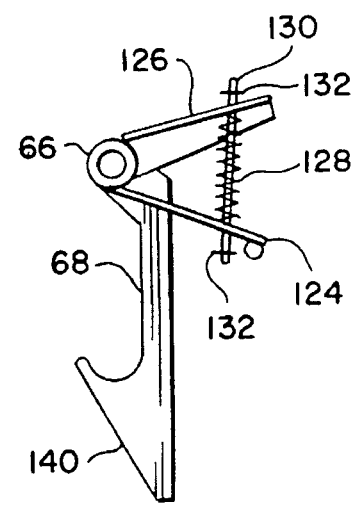
FIG. 4A is a fragmentary, vertical cross-sectional view taken along line 4A—4A of FIG. 4 showing the suspension hook, discriminator follower and crank arm in side elevation, other parts being removed for clarity.

The vertical transfer mechanism of the present invention discriminates between transfer of the load from the delivery conveyor and the return of the load thereto in order to accommodate the suspension hooks 68 and restrict up and down movement of the load exclusively to the vertical transfer axis 76. This is accomplished in the preferred embodiment by a mechanical discriminator that includes, as primary components, a rotatable discriminator cam 120, an actuator 122 for the cam 120, a discriminator follower arm 124 rotatably mounted on the right end of suspension shaft 66 as viewed in FIG. 4, a crank arm 126 on the same end of shaft 66, and a compression spring 128 between the arms 124 and 126 as best shown in FIG. 4A. As seen in FIG. 4A, a rod 130 along the axis of spring 128 extends through apertures in the arms 124 and 126 and is held by a washer 132 on each end retained by a cotter key (not shown) or the like.

FIG. 5 and subsequent views through FIG. 19 show the discriminator and related parts in progressive views. In FIG. 5 the right side of the vertical conveyor apparatus, as viewed in FIGS. 1, 2 and 4, is seen in perspective from within the work station looking outwardly from behind the basket 30. In FIG. 5 the conveyor members 78L and 78R have commenced upward movement from a rest position in order to receive a load that has been delivered by the overhead power and free conveyor. The delivery conveyor has stopped with the suspension bar 34 in substantial alignment with the transfer axis 76 and is awaiting engagement by the cradle members 86. As the discriminator components are located on the right side of the work station and beneath the conveyor trolley 56, that portion of the apparatus is shown in detail in FIGS. 4, 4A and 5–19, it being understood that the cradle member 86 of the left conveyor member 78L will follow the same path and execute the same action in receiving and transporting the end of the suspension bar 34 that it underlies.

The discriminator cam 120 is on a common shaft with a rotary lever 134, the cam 120 being disposed adjacent the inside face of a rectangular housing 136 that is secured to and moves with the conveyor member 78R. As seen in FIG. 6, the rotary lever 134 is adjacent the opposite, outside face of the housing 136 and is disposed such that it is engageable by the actuator 122, the latter being of angle shaped configuration and pivoted at its apex on a mounting plate 138 attached to and projecting from leg 46. The presence of a stop 140 prevents rotation of actuator 122 in a clockwise direction as viewed in FIG. 6 and thus it engages and indexes the rotary lever 134 in 90° increments each time the discriminator cam 120 passes actuator 122 during upward movement. It should be noted, however, as seen in FIG. 19, that the actuator 122 will simply be pushed aside by one of the four arms of the rotary lever 134 when the assembly is moving downwardly, thus the cam 120 during the downward stroke of the transfer mechanism is not shifted.

Figure 8:
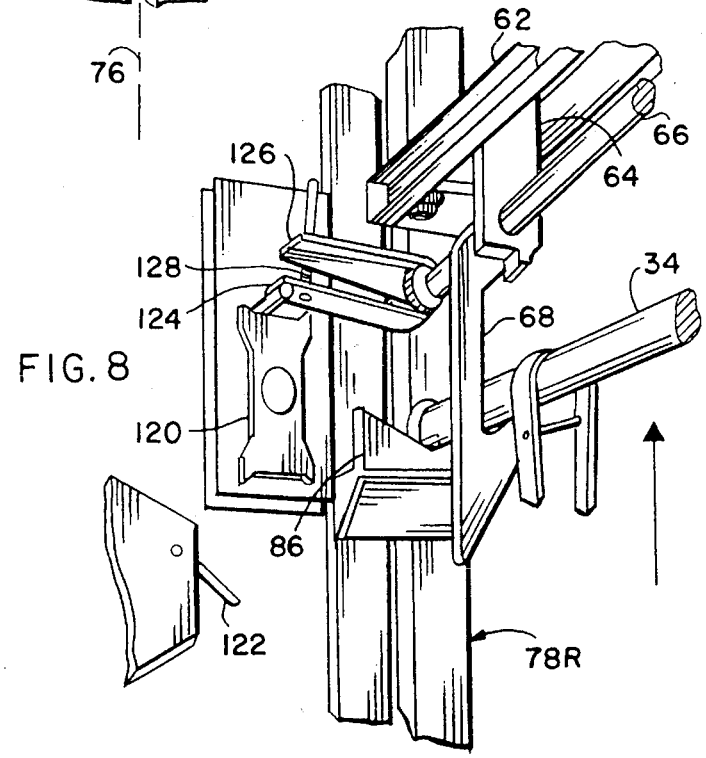
FIG. 8 is a view similar to FIG. 5 showing the transfer mechanism near the upper limit of its travel with the discriminator spring fully compressed.
Figure 9:
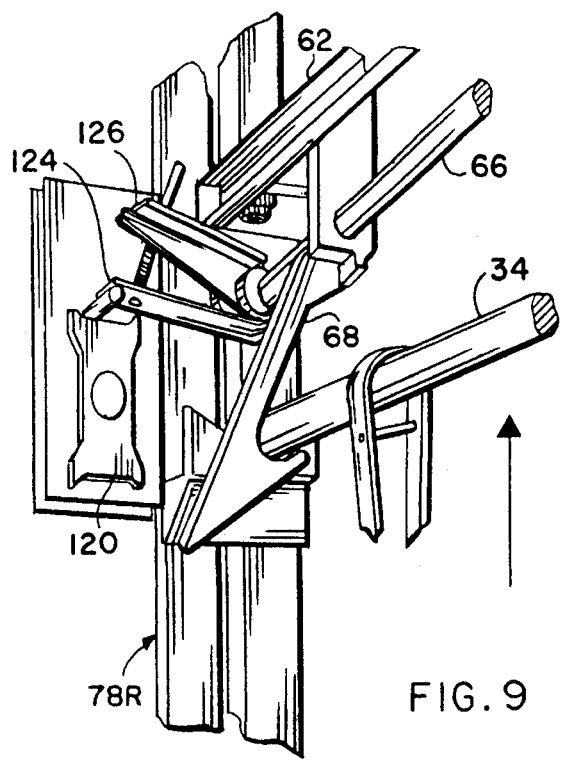
FIG. 9 shows still further upward movement and the action of the discriminator spring in disengaging the suspension hook from the bar.
Figure 11:
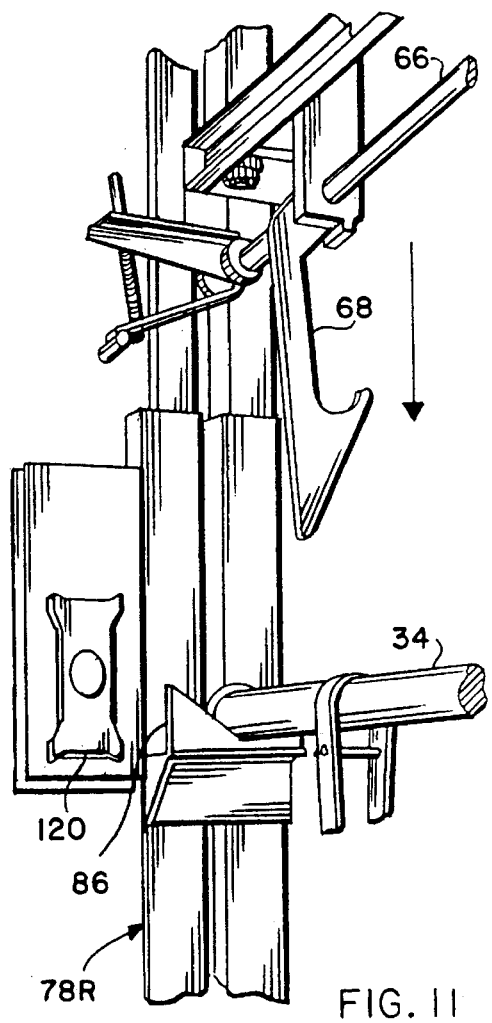
FIGS. 10 and 11 are further progressive views showing the transfer mechanism in downward movement toward the working position.
Figure 10:
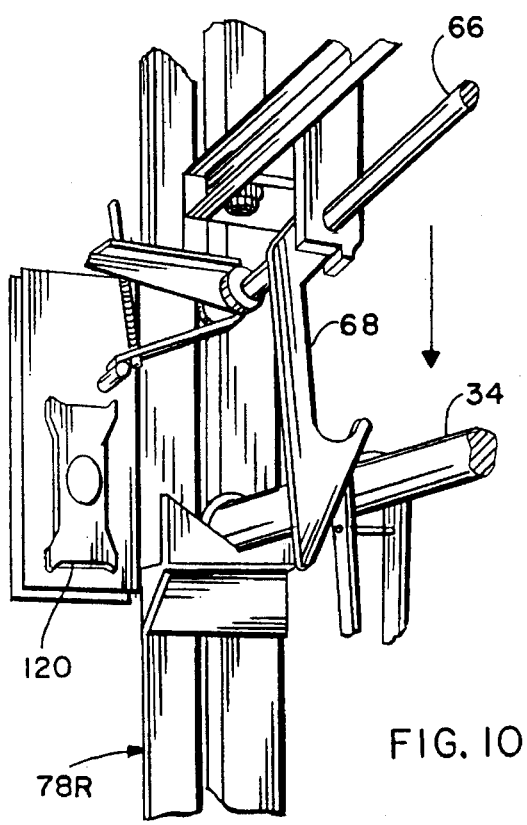

Referring to FIGS. 5–8, it may be appreciated that the continued upward movement of the conveyor member 78R past the actuator 122 causes the discriminator cam 120 to shift 90° to the position shown in FIGS. 7 and 8. Being in the general shape of a rectangular bar, the cam 120 in the position shown in FIGS. 7 and 8 now projects upwardly and has a longer reach than in the horizontal position of FIG. 5. Therefore, the action occurs as seen in FIG. 8 as cam 120 engages the tip of the follower arm 124 and places spring 128 under high compression as the conveyor approaches the upper limit of its movement. Note, however, that in FIG. 8 the crank arm 126 has not moved because the suspension bar 34, though now engaged by the cradle member 86, is still sufficiently seated in the hook 68 that the weight of the load precludes rotation of hook 68 in response to spring 128. Therefore, the action of the cam 120 against its follower 124 is mechanically defeated at this point in the operational cycle and remains defeated until the load-receiving cradle member 86 advances to the position shown in FIG. 9 where the suspension bar 34 now clears the hook. At this time the spring 138 expands from its compressed state and rotates the crank arm 126 in a clockwise direction to swing the hook 68 sufficiently clear of the bar 34 to release the bar and permit downward movement of the conveyor, carrying the bar 34, as seen in the progressive views of FIGS. 10 and 11. In FIG. 10, the spring has returned to its normal, load-carrying position under the force of gravity.

Further downward movement of the conveyor stops at the elevation that places the article holder 32 in the working position within the work station. After a dwell determined by the processing or treatment to be performed, the conveyor commences return movement as illustrated in FIG. 12. Other than for the direction of movement, the disposition of the various working parts in FIG. 12 is the same as in FIG. 11.

Upward movement, however, effects indexing of the discriminator cam 120 as illustrated in FIGS. 13 and 14 and causes the cam to assume the horizontal position shown in FIG. 15. Now the cam 120 is inoperative as it does not sufficiently engage the follower arm 124 to hold the hook 68 in its load-releasing position. Accordingly, the suspension bar 34 engages a cam surface 140 presented by the lower end portion of the hook 68 as the bar 34 moves from the FIG. 15 to the FIG. 16 position, thereby causing the hook to momentarily swing to the left as the bar 34 passes and then return to its load-carrying position seen in FIG. 17. Downward movement of the conveyor then reseats the bar 34 in the hook 68 as shown in FIG. 18 and, of course, likewise seats the other end of the bar 34 in the hook 68 at the left side of the work station beneath the conveyor trolley 58 (FIG. 2).

Figure 20:
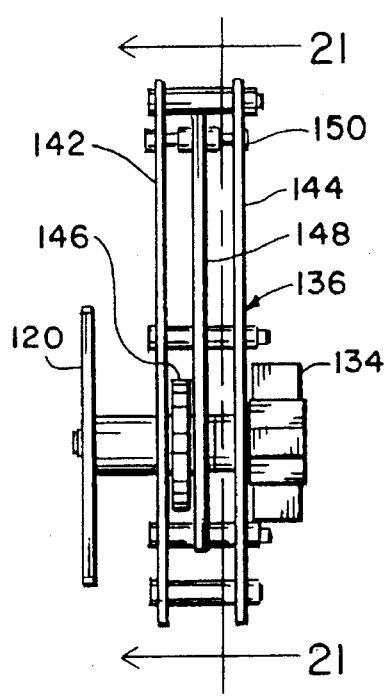
FIG. 20 is a side view of the discriminator cam housing showing internal components.
Figure 21:
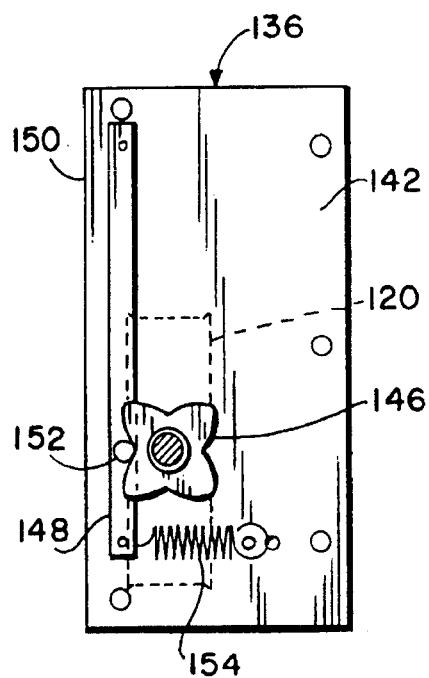
FIG. 21 is a vertical sectional view taken along line 21—21 of FIG. 20.
Figure 22:
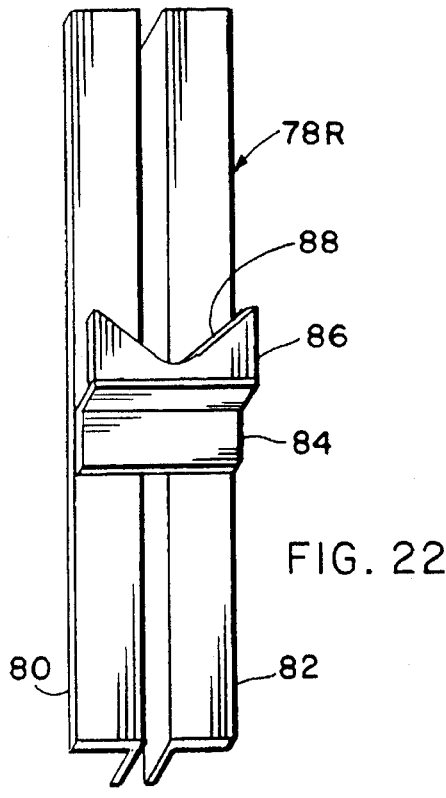
FIG. 22 is a perspective view showing one of the two conveyor members that rides in the vertical track of the transfer mechanism.

FIGS. 20 and 21 show in detail the manner in which the discriminator cam 20 is alternately indexed to its operative and inoperative positions. In FIG. 20 the housing 136 is shown removed from the conveyor member 78R and is revealed in side elevation as seen looking rearwardly from the work station. The discriminator cam 120 is in its operative position as illustrated in FIGS. 7–12. The housing 136 comprises a pair of spaced plates 142 and 144 through which the common shaft extends that carries both the cam 120 and the rotary lever 134. A four-lobed rotary cam 146 is also secured to such common shaft and is located between the plates 142 and 144 adjacent the plate 142. An elongated arm 148 is mounted between the plates 142 and 144 by a pivot pin 150 at its upper end, and carries a camroll 152 which rides on the rotary cam 146. The lower end of the arm 148 is connected to a coil spring 154 anchored in the housing 136 and which is held in tension, thereby biasing the arm 148 in a counter-clockwise direction about pivot pin 150 as viewed in FIG. 21. This forces the camroll 152 to follow the surface of the lobed cam 146.

Referring to the action shown in FIGS. 6 and 7 of resetting the cam 120 to its operative position, and FIGS. 13 and 14 showing return of the cam 120 to its inoperative position, it may be appreciated that each time one of the four radial arms of the rotary lever 134 strikes the actuator 122 during upward movement of the conveyor member 78R, the rotary lever 134 (and hence the discriminator cam 120) will be indexed 90° as the camroll 152 comes to rest in the next valley between adjacent lobes of the rotary cam 146 (FIG. 21).

It should also be appreciated that the V-shaped configuration of the receiving surfaces of the cradles 86 of the conveyor members 78L and 78R provides a centering action to compensate for any drift of the suspension bar 34 away from true alignment with the transfer axis 76. Therefore, should the power and free delivery conveyor not stop at the station with the bar 34 in exact alignment for transfer, the bar 34 will ultimately move into true alignment as it comes to rest at the bottoms of the V-shaped surfaces 88 as illustrated, for example, in FIG. 8. Furthermore, the ability of the hooks 68 to swing about an axis of rotation provided by the suspension shaft 66 also provides a centering action to compensate for any drift of the bar 34 away from a vertical plane through the suspension shaft 66.

Figure 23:
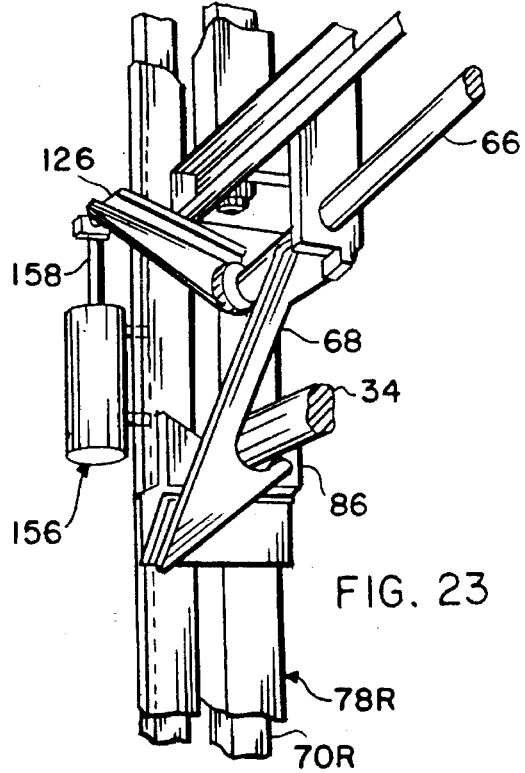
FIG. 23 is similar to FIG. 9 but illustrates an alternative embodiment in which the crank arm is operated by an air cylinder.

Referring to FIG. 23, an alternative embodiment is shown in which the discriminating function is achieved through the use of an extensible and retractable actuator device, e.g. a single-acting pneumatic piston and cylinder assembly 156 mounted on track 70R. FIG. 23 depicts the instant in the upward movement of the conveyor member 78R corresponding to FIG. 9; at this point the piston rod 158 extends into engagement with crank arm 126 to rotate the arm, shaft 66 and hook 68 as illustrated in FIG. 23, thereby releasing the bar 34 which is now received by the cradle member 86. The piston rod 158 retracts after the bar 34 has been carried downwardly past the hook 38, the activation of the actuator device 156 being controlled by a solenoid valve 222 and associated circuitry (FIG. 24) described below.

THE TIPPING STOP

Figure 3:
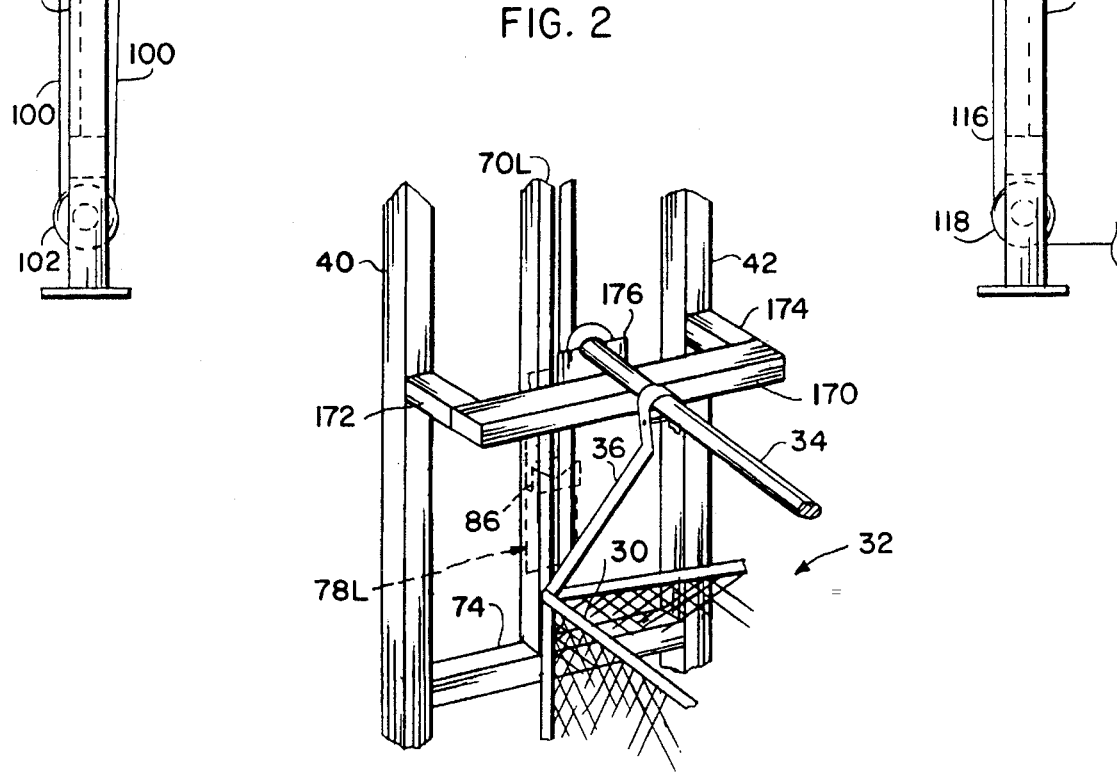
FIG. 3 is a fragmentary, perspective view of a modified form of the apparatus showing a stop at the left side of the supporting framework for tipping the article holder.

In FIG. 3 an optional feature is illustrated which facilitates degassing or bubbling off trapped air in applications in which the basket 30 (containing articles to be treated) is immersed in a treatment bath when it is lowered to the working position at the base of the work station. A U-shaped bracket presents a cross bar 170 and a pair of horizontal legs 172 and 174 secured to vertical legs 40 and 42, respectively, of the framework so as to space the cross bar 170 inwardly in the path of the suspension bar 34. A stop plate 176 is carried by the bracket and projects upwardly from the central portion of the cross bar 170.

As illustrated in FIG. 3, the top of the stop plate 176 is recessed to receive the left end of the suspension bar 34 of the article holder 32, and is located vertically on the legs 40 and 42 a sufficient distance from the bottom of the framework to cause the left end of the suspension bar 34 to engage and be held by the stop plate 176 before the article holder 32 reaches its lowermost or working position. Accordingly, the left end of the suspension bar 34 is held by the stop 176 while the cradle member 86 of conveyor member 78L continues downward movement to its lowermost position, whereas the cradle member 86 of the conveyor member 78R (not shown in FIG. 3) remains engaged with the suspension bar 34. The result is that the right end of the basket 30 continues downwardly to the lowermost position shown in FIG. 1 while the left end of the bar 34 remains in an elevated position due to the stop 176. As the left end of the bar 34 is higher than the right end, the basket 30 is tipped rather than level as in FIG. 1 to assist in the release of air trapped within the articles carried by the basket 30.

THE CONTROL CIRCUIT

Figure 24:
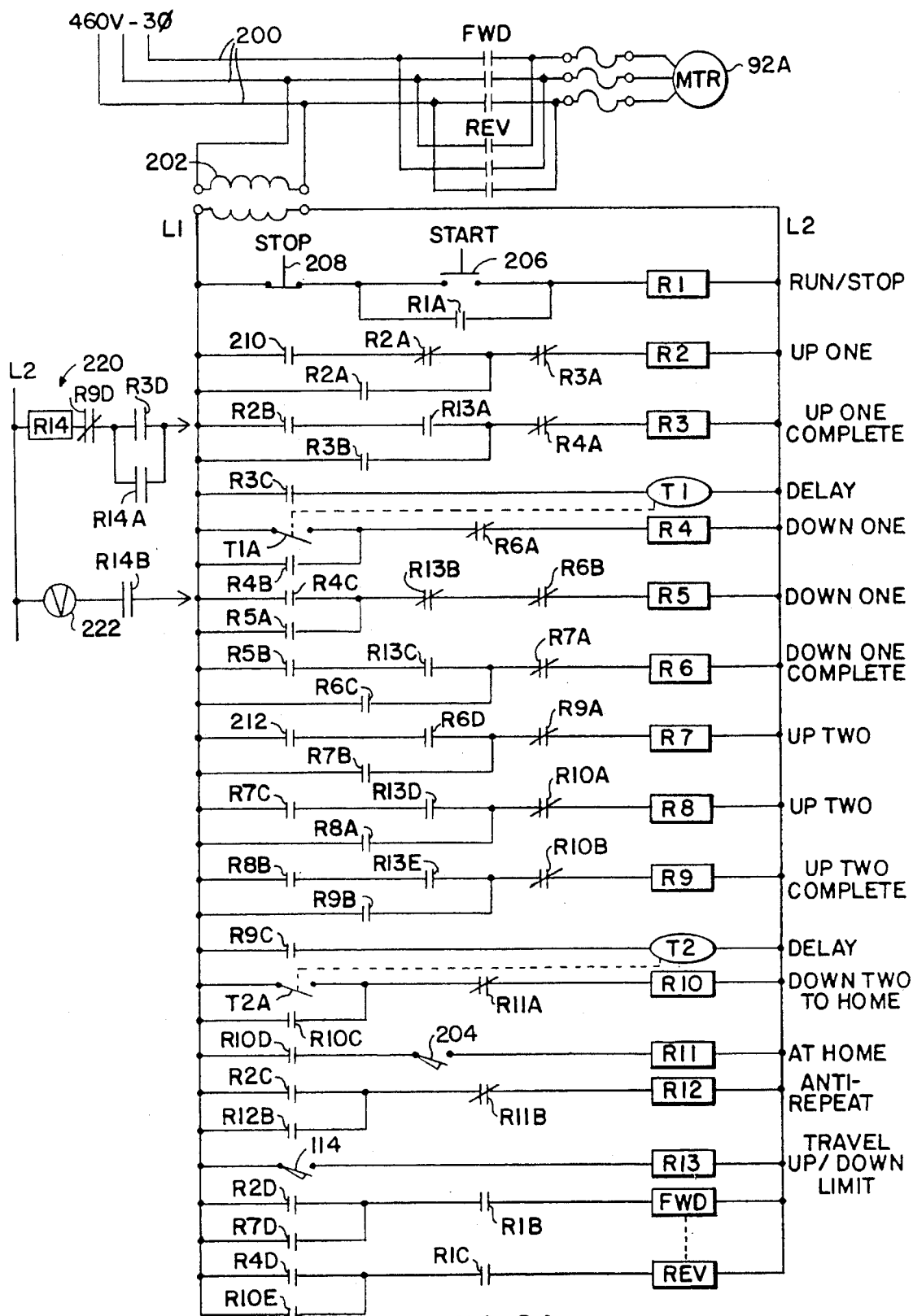
FIG. 24 is a schematic diagram of the control circuitry for the transfer mechanism.

Referring to FIG. 24, the drive motor of the winch 92 is schematically illustrated at 92A and comprises a three-phase, reversible electric motor controlled by a forward motor relay FWD and a reverse motor relay REV. The coils of these relays are shown at the bottom right of the circuitry to be discussed, and their respective contacts are interposed in the three-phase supply lines 200 at the top of FIG. 24. Each set of three FWD and REV contacts are normally open and, when closed, provide excitation to the motor 92A for rotation of the winch in forward and reverse directions corresponding to upward and downward movement, respectively, of the conveyor members 78L and 78R.

A step-down transformer 202 connected to two of the lines 200 converts the 460-volt supply to 120 volts, single phase for operation of the various relays of the motor control circuit R1 through R13, and time delay relays T1 and T2. For convenience of description, the common left line of the control circuit in FIG. 24 from the left end of the secondary of transformer 202 is designated L1, and the line from the opposite end of the secondary is designated L2. The legends at the right arranged vertically describe the progression of the relay ladder logic employed by the control circuit.

For purposes of illustration, it is assumed that the conveyor members 78L and 78R of the transfer mechanism are beginning a cycle from their rest or home position which is substantially the condition of the transfer mechanism shown in FIG. 5. A limit switch 204, the location of which is shown in broken lines in FIG. 5, is held closed at the home position by the presence of the cradle member 86 and is shown in the normally open condition in FIG. 24 (AT HOME).

A normally open START switch is momentarily depressed to commence the cycle. As the STOP switch 208 is normally closed, momentary closure of the START switch energizes relay coil R1 which latches through its normally open contacts R1A in parallel with switch 206. Contacts R1B and R1C likewise close, and are in series with the FWD and REV coils respectively. Accordingly, the vertical conveyor is now in condition for upward movement in response to an automated cycle START command which is illustrated herein by the closure of a normally open, cycle START switch 210. This energizes relay coil R2 (UP ONE) which is latched through R2A, closes R2B and R2C, and closes R2D to energize the forward motor relay coil FWD through the now closed R1B contact. Upward movement continues until the right stop 110 (FIG. 3) engages the actuator arm 112 of limit switch 114 to close the latter and energize relay coil R13 (TRAVEL UP/DOWN LIMIT). Relay coil R13 operates contacts R13A, B, C, D and E, closure of R13A causing energization of relay coil R3 (UP ONE COMPLETE) which latches through R3B and opens contacts R3A to deenergize relay coil R2, reopening its contacts R2D and deenergizing the forward motor relay coil FWD. This opens the FWD contacts and motor 92A stops.

Closure of contacts R3C at this time energizes time delay relay T1 which, after a one second settling time to prepare the mechanism for downward movement, closes its normally open contact T1A to energize relay coil R4 (DOWN ONE). Energization of R4 operates its contacts R4A, B, C and D to latch coil R4 through contacts R4B and energize relay coil R5 by closure of contacts R4C when R13B closes, thereby closing contacts R5A and R5B. Closure of contacts R4D energizes the REV coil to close the REV contacts and operate motor 92A in the reverse direction. Relay coil R13 is dropped out as limit switch 114 is now reopened thereby returning contacts R13B to the closed condition. When the left stop 110 (FIG. 2) engages the actuator arm 112 of limit switch 114, the vertical conveyor has reached its lowermost position and stops due to reclosure of limit switch 114 and reenergization of relay coil R13 which, in turn, energizes relay coil R6 (DOWN ONE COMPLETE). Contacts R4D, which had previously closed when R4 was energized to initiate downward movement, are now reopened as relay coil R4 drops out in response to the opening of contacts R6A. Contacts R6B also open and R6C and R6D close. The vertical conveyor now waits at the lowermost position in the work station until processing is complete.

Subsequently, when work has been completed at the work station, a COMPLETE command (which may be automatically generated) initiates return movement and is illustrated herein by the closure of a COMPLETE switch 212 which establishes a power circuit to relay coil R7 through now-closed contacts R6D and normally closed contacts R9A. Energization of relay coil R7 operates its contacts R7A, B, C and D, it being noted that closure of R7C also energizes relay coil R8 as relay coil R13 is deenergized (contacts R13D closed) so long as limit switch 114 is open. Coil R8 then latches through its contacts R8A and contacts R8B close. Energization of coil R7 closed its contacts R7D to again establish a power circuit to the FWD coil and thereby operate motor 92A in the forward direction.

When the UP TWO phase of the cycle is complete, limit switch 114 again closes and relay coil R13 is reenergized resulting in closure of contacts R13E and energization of relay coil R9 (UP TWO COMPLETE). This operates its contacts R9A, B and C, opening of the contacts R9A causing relay coil R7 to drop out and thereby reopen its contacts R7D to deenergize the FWD motor relay coil. Closure of contacts R9C energizes time delay relay coil T2 which, after a one second settling time, closes its contacts T2A to energize relay coil R10. This operates relay contacts R10A, B, C, D and E, the closure of contacts R10E resulting in energization of the REV motor relay coil to cause reverse operation of the motor 92A. The conveyor members 78L and 78R now travel downwardly to return to the HOME position, at which point limit switch 204 closes to energize relay coil R11, open its contacts R11A, deenergize coil R10, and thus open contacts R10E to deenergize the REV motor relay coil. R11 also opens its contacts R11B to maintain relay coil R12 deenergized so that the cycle may repeat in response to the next closure of the cycle START switch 210. (While a cycle is in progress, R12 latches through its contacts R12B and opens contacts R12A in series with coil R2 to execute an ANTI-REPEAT function.)

A secondary control circuit 220 is also employed when the discriminating function is accomplished with the actuator device (air cylinder) 156 shown in FIG. 23 and described above. The solenoid valve 222 is connected across line L1 and an extension of line L2 through series relay contacts R14B under the control of a relay coil R14. In this embodiment relays R3 and R9 are provided with additional contacts R3D and R9D respectively as shown in circuit 220, which are in series and connect coil R14 across lines L1 and L2. Contacts R3D are normally open and R9D are normally closed. As is apparent, energization of relay coil R3 at the completion of initial upward movement of the vertical conveyor (UP ONE COMPLETE) closes contacts R3D to energize relay coil R14 which is then held energized through its latching contacts R14A in parallel with R3D. Closure of contacts R14B by energization of relay coil R14 in turn energizes the solenoid valve 222 to supply pressurized air to the cylinder 156 and extend the piston rod 158. As shown in FIG. 23, this swings the hook 68 clear of the bar 34. The piston rod 158 retracts at UP TWO COMPLETE upon energization of relay coil R9 which opens its contacts R9D to deenergize relay coil R14, permitting the hooks 68 to return to the vertical position where they will receive the bar 34 and return the load to the overhead delivery conveyor.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A conveyor system comprising:

a work station having a supporting structure, a transfer mechanism mounted on said structure and having means defining a single, upright transfer axis along which articles or products are moved into said station to a working position, conveyance means for delivering a load to said station for transfer thereinto along said axis, and having a load suspension member movable between a first, load-carrying position aligned with said axis and a second, load-releasing position displaced from said axis, an article holder for carrying the load and provided with a support component engageable with said suspension member for attaching the holder thereto, said transfer mechanism including raising and lowering means at said station having receiver means movable along said transfer axis for engaging said support component of the holder, lowering the holder from said suspension member to said working position and thereafter raising the holder from said working position, and discriminator means responsive to movement of said receiver means along said axis for shifting said suspension member from said first to said second position thereof upon movement of said receiver means into engagement with said support component to release the component from said suspension member and transfer the load to said raising and lowering means, and thereafter returning the suspension member to said first position for reengagement of the member with the support component when the article holder is raised from said working position, whereby the article holder is transferred from said conveyance means to said raising and lowering means, lowered to said working position at the work station and then returned to the conveyance means without displacing the holder from said transfer axis, said discriminator means including an element movable with said receiver means, operating means responsive to engagement by said element for shifting said suspension member from said first to said second position, and means for defeating the action of said operating means until said receiver means engages said support component to receive the load.

2. The combination as claimed in claim 1, wherein said transfer axis defining means comprises a track extending upwardly from said working position toward said conveyance means, said receiver means being movable along said track.

3. The combination as claimed in claim 1, wherein said suspension member includes a depending hook for receiving said support component, and means mounting said hook for swinging movement between said first and second positions.

4. The combination as claimed in claim 1, wherein said element and operating means comprise a cam and follower means respectively.

5. The combination as claimed in claim 1, wherein said conveyance means includes a generally horizontally extending, rotatable suspension shaft, and said suspension member comprises a hook depending from said shaft and rotatable therewith between said first and second positions.

6. The combination as claimed in claim 5, wherein said element comprises a cam movable with said receiver means, said operating means and defeating means including a follower arm extending from said suspension shaft and rotatable thereon in response to engagement by said cam, a crank arm extending from said shaft, and yieldable means interconnecting said arms for allowing movement of the follower arm independently of the crank arm in response to engagement by said cam until said receiver means engages said support component to receive the load, and thereafter actuating said crank arm to shift said hook from said first to said second position thereof.

7. The combination as claimed in claim 6, wherein said discriminator means further includes means mounting said cam for selective movement between operative and inoperative positions, and actuator means for shifting said cam alternately between said positions thereof during upward movement of said receiver means toward said conveyance means whereby, when the cam is shifted to its operative position, the article holder will be transferred from said conveyance means to said raising and lowering means, and when the cam is in its inoperative position, the article holder will be reattached to said hook.

8. The combination as claimed in claim 1, wherein said transfer axis defining means comprises a track extending vertically from said working position toward said conveyance means, and wherein said raising and lowering means includes a conveyor member movable along said track and provide with said receiver means, and drive means connected to said conveyor member for moving the same upwardly along said track and downwardly therealong including connecting linkage means extending from said conveyor member and adapted to be connected with a conveyor member in a conveyor system at an adjacent work station, whereby the drive means may be employed to cause the simultaneous raising and lowering of article holders at a plurality of work stations.

9. The combination as claimed in claim 1, wherein said transfer axis defining means comprises a track extending vertically from said working position toward said conveyance means, said support component of the article holder including a generally horizontally extending suspension bar, said receiver means being movable along said track and including a cradle of generally V-shaped configuration for receiving and supporting said suspension bar upon engagement therewith, whereby the generally V-shaped configuration of the cradle provides a centering action to compensate for any drift of the suspension bar away from said transfer axis.

10. The combination as claimed in claim. 9, wherein said suspension member includes a depending hook for receiving said suspension bar, and means mounting said hook for swinging movement between said first and second positions and providing a centering action upon engagement with said suspension bar to compensate for any drift of the bar away from said transfer axis, and said hook having a lower end portion presenting a cam surface responsive to engagement by said suspension bar for causing the hook to momentarily swing toward its second position to reengage the bar when the article holder is returned to the conveyance means.

11. The combination as claimed in claim 1, wherein said transfer axis defining means comprises a pair of horizontally spaced tracks extending vertically from said working position toward said conveyance means, said support component of the article holder having horizontally spaced, opposite end portions, said receiver means being movable along said tracks and including a pair of conveyor members on respective tracks for receiving and supporting the opposite end portions of said component upon engagement therewith, there being stop means adjacent one of said tracks engageable by one end portion of said component for limiting downward movement of said one end at said working position, whereby the opposite end of the component is carried by its supporting conveyor member to a lower elevation to tip the article holder and facilitate degassing of the load at the working position.

12. A conveyor system comprising:

a work station having a supporting structure, a transfer mechanism mounted on said structure and having means defining a single, upright transfer axis along which articles or products are moved into said station to a working position, conveyance means for delivering a load to said station for transfer thereinto along said axis, and having a load suspension member movable between a first, load-carrying position aligned with said axis and a second, load-releasing position displaced from said axis, an article holder for carrying the load and provided with a support component engageable with said suspension member for attaching the holder thereto, said transfer mechanism including raising and lowering means at said station having receiver means movable along said transfer axis for engaging said support component of the holder, lowering the holder from said suspension member to said working position and thereafter raising the holder from said working position, and discriminator means responsive to movement of said receiver means along said axis for shifting said suspension member from said first to said second position thereof upon movement of said receiver means into engagement with said support component to release the component from said suspension member and transfer the load to said raising and lowering means, and thereafter returning the suspension member to said first position for reengagement of the member with the support component when the article holder is raised from said working position, whereby the article holder is transferred from said conveyance means to said raising and lowering means, lowered to said working position at the work station and then returned to the conveyance means without displacing the holder from said transfer axis, said discriminator means including an extensible and retractable actuator device for effecting said shifting of the suspension member from said first to said second position thereof.

* * * * *